UNITED STATES PATENT OFFICE 2,108,787

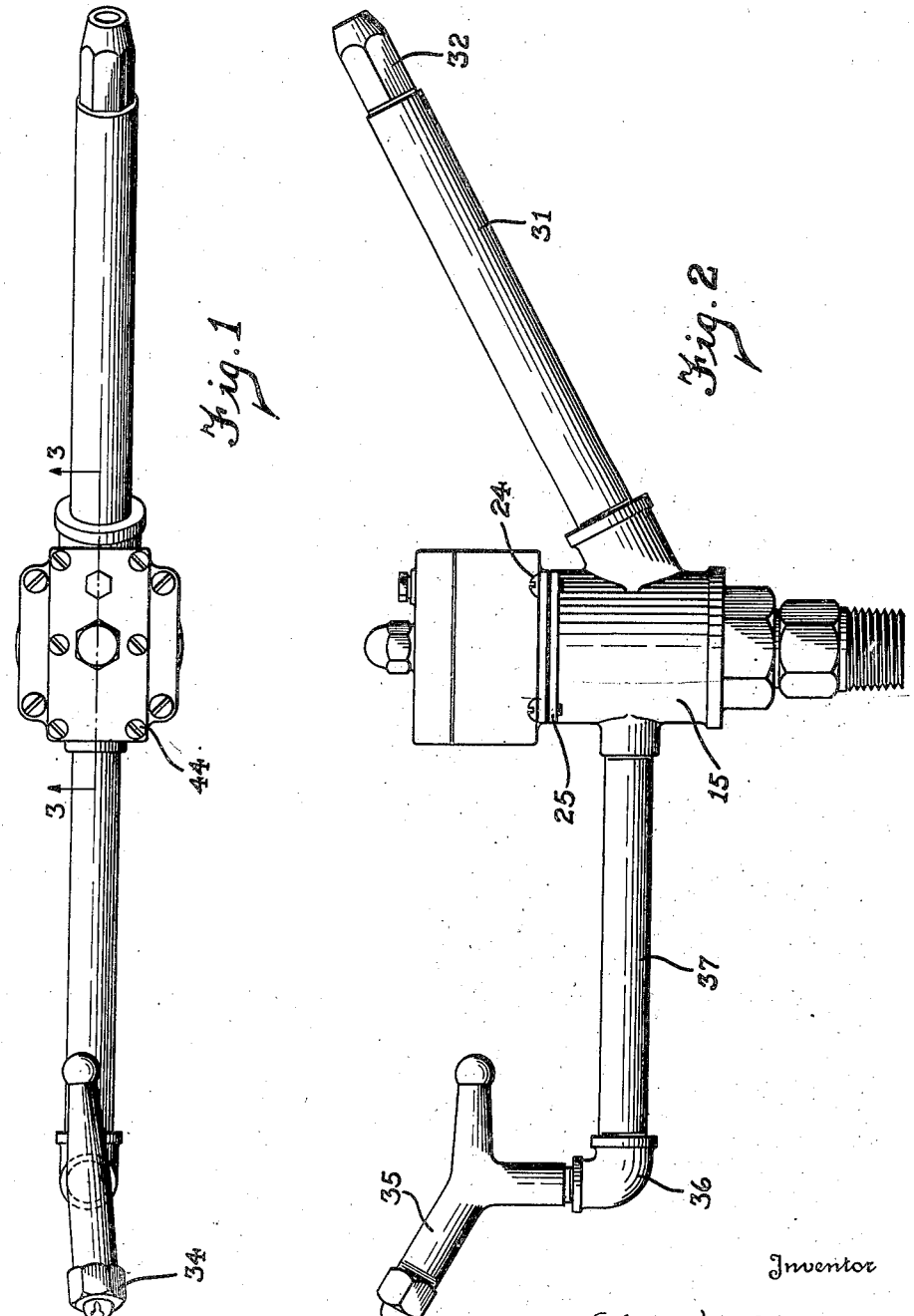

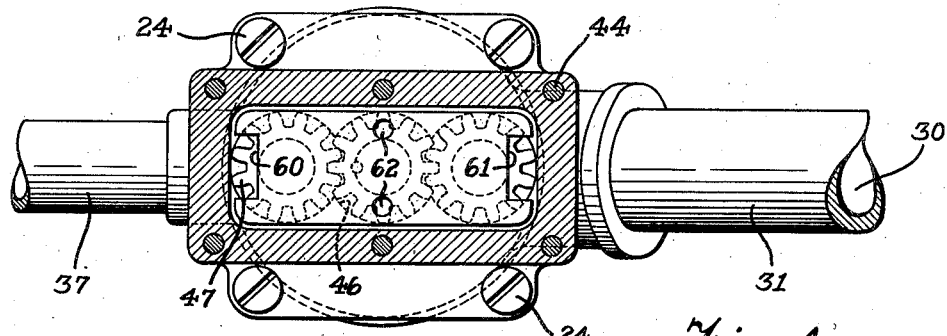
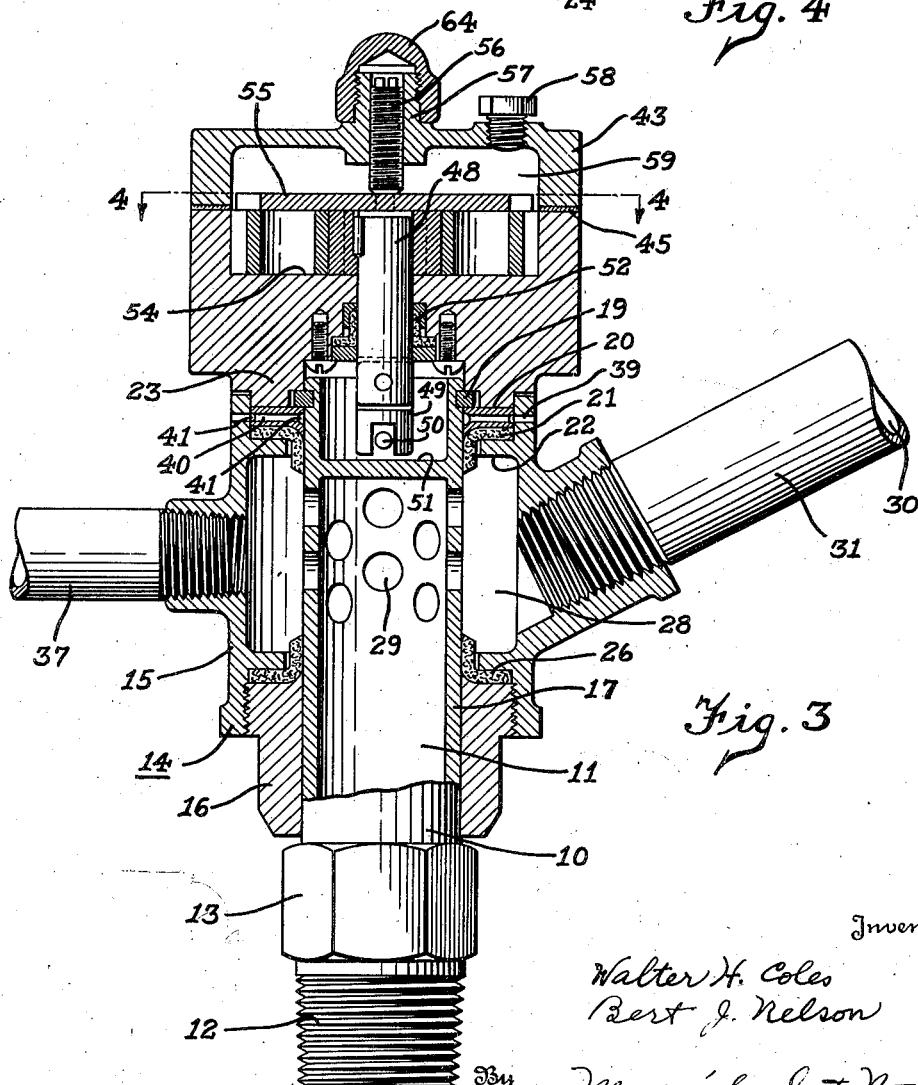

IRRIGATION DEVICE

Walter H. Coles and Bert J. Nelson, Troy, Ohio, assignors to The Skinner Irrigation Company, Troy, Ohio, a corporation of Ohio Application February 1, 1936, Serial No. 61,851

8 Claims. (Cl. 299—69)

This invention relates to irrigation devices, and more particularly to water supply devices or the like having a revolving water distributing pipe.

One object of the invention is the provision of a sprinkling apparatus of economical and simple construction adapted for the free rotation of a water distributing member under a force created by a reaction jet or jets, the speed of rotation of the sprinkling member being limited by a brake device that exerts a restraining effect that is substantially uniform in all positions of rotation of the sprinkling member.

Another object of the invention is the provision of a sprinkling member of an irrigation device of the character mentioned, in which vertical reaction thrust forces are substantially balanced by proper coordination of the diameters of the upper and lower bearing engagements between the sprinkling member and the supporting member, the sprinkling member having an outwardly and upwardly extending water distributing pipe so arranged that the line of force due to water reaction extends between the upper and lower points of bearing engagement of the sprinkling member.

Another object of the invention is the provision of an irrigation device having a rotatable sprinkling member the speed of operation of which is controlled by a fluid damping means including a housing or casing and intermeshing gear members providing a damping or braking effect that increases rapidly when the speed of rotation increases to limit the speed of operation to a suitable comparatively slow rotation.

Other objects and advantages of the invention will be apparent from the following description, the appended claims and the accompanying drawings, in which,—

Fig. 1 is a top plan view of an irrigation device embodying the present invention;

Fig. 2 is a side elevation of the irrigation device;

Fig. 3 is a vertical central section, on an enlarged scale, taken on the line 3—3 of Fig. 1; and Fig. 4 is a horizontal section taken on the line 4—4 of Fig. 3.

Referring more particularly to the drawings in which a preferred embodiment of the invention is illustrated, 10 designates generally a supporting member having a fluid passage 11, and having a threaded lower end portion 12 by means of which it can be coupled to a water distributing pipe. Above the threads 12 the supporting member 10 is preferably of hexagonal form as indicated at 13 so that it may be readily coupled in place.

Rotatably mounted on the supporting member 10 is a sprinkling member designated generally by reference numeral 14 and including water distributing means and also suitable means providing for the rotation of the sprinkling member so that the stream or streams of water issuing from the sprinkling member are slowly revolved about a vertical axis. More particularly, the sprinkling member comprises a housing portion 15 threaded or otherwise secured to a lower bearing portion 16, the latter being in rotatable bearing engagement with the outer surface of the supporting member 10. The cylindrical bearing surface 17 thus provided is preferably of substantial vertical extent as shown. The upper part of the housing portion 15 also provides a cylindrical bearing engagement with the upper end of the supporting member 10, the upper and lower bearing surfaces being of substantially the same diameter. The upper bearing preferably includes a divided or split bearing ring 19, a thrust washer 20, and a flexible packing strip 21 which is held securely between the flange 22 and the thrust washer 20, the latter being pressed downwardly by the lower end of the top casing 23 which is held in place by screws 24 or the like extending down into threaded engagement with the corner flanges 25 provided on the upper end of the housing portion 15. A suitable flexible packing strip 26 is also provided between the housing portion 15 and the bearing portion 16, as shown in Fig. 3.

Between the upper and lower bearing areas of engagement between the supporting member and the sprinkling member, the latter is provided with a water chamber 28, which is in free communication with the interior of the supporting pipe 10 by means of several openings 29 in the latter. The water has a free passage from the chamber 28 through the comparatively large passage 30 in the main distributing pipe 31 which extends outwardly and upwardly from the housing portion 15 so as to distribute the main portion of the water in a radially outward and upward direction, a nozzle 32 of suitable form being preferably provided on the upper end of the pipe 31. The reaction thrust force produced by the water issuing from the nozzle 32 is in a direction such that the line of force strikes the vertical axis of rotation at a point above the lower end of the lower bearing engagement between the supporting pipe and the sprinkling member, and below the upper bearing surface, so that this reaction force does not produce a cocking tendency such as would tend to tilt the sprinkling member on the supporting member.

The sprinkling member is rotated by the reaction of a jet of water issuing from a nozzle 34 which is provided on a short pipe 35 adjustably supported on an elbow 36 at the outer end of a radially directed pipe 37. The pipe 37 preferably communicates with the water chamber 28 at a point substantially opposite the pipe 31. As will be apparent from Fig. 2 the reaction force as created by the jet of water issuing from the nozzle 34 does not pass substantially below the lower bearing surface of the sprinkling member. The pipe 35 may be set on the elbow 36 so as to direct a stream which is preferably considerably smaller than that issuing from the nozzle 32, in a direction at a suitable angle from a radial plane so as to produce a sufficiently large turning reaction force to provide for the rotation of the sprinkling member. The stream of water issuing from the larger nozzle 32 preferably travels in a radial plane to provide for maximum coverage of the ground.

The housing portion 15, at a point or points above the sealing or packing strip 21, is provided with one or more holes or passages, as indicated at 39 placing this part of the sprinkling member in free communication with the outside. The thrust washer 20 is also provided with several passages 40, the inner and outer surfaces of the washer 20 being grooved as indicated at 41 so that if any water should pass by the packing or sealing strip 21 and find its way above that strip, it can immediately flow through the passages mentioned, to the outside of the housing, and pressures cannot be built up above the packing strip 21. As previously mentioned, the upper and lower bearing surfaces of the sprinkling member are of substantially the same diameter, and as the upper side of the upper bearing member is relieved to the outside air it can be seen that the vertical pressures due to reaction thrust forces are about vertically balanced. The unbalance created merely by the area of the discharge opening of the nozzle 32 can be disregarded inasmuch as it produces a force that is quite small as compared with the value of the comparatively large force tending to move the entire head upwardly.

By reason of the at least approximate balance of vertical thrust forces, and the arrangement of the upper and lower bearing surfaces on opposite sides of the point where the vertical axis of the sprinkler is intersected by the thrust force of the stream issuing from the pipe 31, it can be seen that the sprinkler operates in a substantially balanced and frictionless manner, and is capable of very free movement on the supporting pipe 10. The reaction force created by the reaction sprinkler 34, however, is preferably made of a substantial value so as to give definite assurance that a rotation of the sprinkler will take place when the water is supplied under pressure to the supporting pipe 10. To control the speed of rotation, however, and give a comparatively slow speed movement and thus provide for maximum throw of the water issuing from the nozzle 32, speed controlling means is provided to limit the speed of rotation to a suitable slow speed and providing a constant braking value at any point of rotation for any particular speed.

This speed control means preferably comprises the top casing 23 and a plurality of intermeshing gears which are mounted in the top casing for relative rotational movements, the sprinkling member and the supporting member being connected to the casing and the gears, and fluid damping means being provided in the casing and adapted for flow through a restricted passage. More particularly, the casing 23 includes a cover member 43 which is secured to the lower part of the casing by means of screws 44 or the like, a gasket 45 being preferably provided between the two parts of the gear casing. The casing is provided with a plurality of cylindrically curved recesses 46, herein shown as three in number and each adapted for the reception of a gear 47. The three gears 47 intermesh with one another and have only a small operating clearance between the outer ends of their teeth and the cylindrically curved walls 46 of the casing. The central gear 47 is keyed or otherwise secured to a short shaft 48 which is rotatably supported in alignment with the supporting pipe 10, the lower end of the shaft 48 having a bifurcated coupling member 49 which engages a cross pin 50 fixed in the upper end of the supporting pipe 10 just above an end wall 51. Suitable packing means as indicated at 52 is arranged to prevent the flow of liquid from the gear chamber downwardly along the shaft 48. The lower ends of the gears 47 operate against the flat lower surface 54 provided in the casing 23, the upper ends of the gears being retained by a pressure plate 55 which is held downwardly towards the gears by an adjusting screw 56 which is threaded in the boss 57 provided centrally of the cover portion 43. In its lowest position on the gear casing member an operating clearance is preferably provided below the plate 55 at the ends of the gears. 58 designates a removable plug which can be readily removed so as to supply the gear chamber 59 with a suitable quantity of fluid, such as oil, that fills the chamber.

With such a construction up to a certain speed of rotation there is very little braking effect as the oil flows slowly through the small clearance passages. After the capacity of these clearance passages is exceeded, however, by increase of the turning forces, the braking effect rapidly increases and a maximum speed, depending on the adjustment of the plate 55, cannot be exceeded.

As will now be apparent, the rotational movements of the sprinkling member cause the rotation of the gear casing, while the central gear itself remains stationary. The outside gears are carried around with the housing, in meshing engagement with the central gear, so that the oil within the gear casing, and which flows into the spaces between the gear teeth and the cylindrical wall of the casing, is squeezed out at the point of meshing engagement of the gears, and can only flow away through the restricted passage between the ends of the gears and the plate 55. This plate is provided with passages 60 and 61 providing for free flow of the oil from above the plate to the spaces between the gear teeth, additional holes 62 providing for the filling of the gear teeth spaces of the central gear.

The speed of operation of the sprinkling member can be readily controlled merely by removing the cover cap 64 and turning the screw 56 either downwardly or upwardly to increase or decrease the amount of restriction provided for the flow of oil from the points of interengagement of the gear teeth. As will be apparent, in view of the substantial number of teeth provided on each of the gears, the damping action provided for by means of the pumping action of the intermeshing gears is substantially constant or uniform for all positions of rotation of the sprinkling member, so that the latter can rotate at a comparatively slow speed and in a substantially uniform manner, and as fast or as slow as desired.

With the construction as described, it will be quite practical to remove, repair and replace a braking unit during the continued operation of the sprinkler, without getting wet.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A water sprinkler comprising a supporting member having a water supply passage therein, a rotatable sprinkling member having upper and lower areas of bearing engagement with said supporting member, a distributing pipe extending outwardly and upwardly from one side of said sprinkling member and in free communication with said water supply passage and adapted to distribute a stream of water radially outwardly and upwardly from said sprinkling member, reaction means mounted on said sprinkling member in communication with said water supply passage and adapted to distribute a portion of the water to produce a reaction force tending to rotate the sprinkling member on its supporting member, a casing fixed to said sprinkling member and carried at the top thereof substantially coaxially with said supporting member, and speed controlling means in said casing exerting a substantially uniform restraining effect on rotational movements of said sprinkling member.

2. A water sprinkler comprising a supporting member having a water supply passage therein, a rotatable sprinkling member surrounding the upper end of said supporting member and having upper and lower areas of bearing engagement, of commensurate diameter, with said supporting member, and having a water chamber between its upper and lower points of bearing engagement in communication with said water supply passage, said sprinkling member having free communication with the outside at a point above said water chamber, a distributing pipe extending from said sprinkling member and in communication with said chamber and adapted to distribute a stream of water outwardly and upwardly from said sprinkling member, means carried by said sprinkling member in communication with said chamber and adapted to produce a rotational force on said sprinkling member, a casing detachably carried upon said sprinkling member above said water chamber, and rotatable speed controlling displacement means in said casing, said casing and displacement means being connected to said members for restraining rotational movements of the sprinkling member.

3. A water sprinkler comprising a supporting member having a water supply passage therein, a rotatable sprinkling member surrounding the upper end of said supporting member and having upper and lower areas of bearing engagement, of commensurate diameter, with said supporting member, said sprinkling member having free communication with the outside at a point above the said upper bearing engagement, said sprinkling member having a water chamber between its upper and lower points of bearing engagement and in free communication with said water supply passage, a distributing pipe extending from said sprinkling member and in free communication with said chamber and adapted to distribute a stream of water substantially radially and upwardly from said sprinkling member, reaction means carried by said sprinkling member in communication with said chamber and adapted to produce a reaction force for rotation of said sprinkling member on said supporting member, a closed casing, displacement means in said casing rotatable relatively thereto, and fluid damping means in said casing restricting the relative rotation of said casing and displacement means, said casing and displacement means being connected to said members for restraining rotational movement of the sprinkling member.

4. A water sprinkler comprising a supporting member having a water supply passage therein, a rotatable sprinkling member having its lower portion surrounding said supporting member and in rotatable bearing engagement therewith and its upper portion surrounding an upper portion of said supporting member and in rotatable bearing engagement therewith, the upper and lower bearings having substantially the same diameter and said sprinkling member being in communication with the outside at a point just above its upper bearing engagement with the supporting member so that vertical reaction thrust forces are substantially balanced, said sprinkling member having a water chamber between its upper and lower points of bearing engagement with the supporting member and in free communication with said water supply passage, a main distributing pipe extending outwardly and upwardly from one side of said sprinkling member and in free communication with said chamber and adapted to distribute the main portion of the water radially and upwardly from said sprinkling member in a single stream, a reaction sprinkler mounted on said sprinkling member in communication with said chamber and adapted to distribute a smaller portion of the water to produce a reaction force tending to rotate the sprinkling member, a closed casing fixed to said sprinkling member above said water chamber, a plurality of intermeshing gears mounted for relative rotational movements in said casing, means fixing one of said gears to said supporting member, and liquid damping means in said casing, said casing providing a restricted return path for liquid displaced by the intermeshing gear teeth to produce a restraining effect on the sprinkling member, and means for adjusting the amount of restriction in said restricted return path for control of the speed of rotation of the sprinkling member.

5. A water sprinkler comprising a supporting member having a water supply passage therein, a rotatable sprinkling member having upper and lower areas of bearing engagement, of commensurate diameter, with said supporting member, said sprinkling member having free communication with the outside at a point just above the said upper bearing engagement, said sprinkling member having a water chamber between its upper and lower points of bearing engagement and in free communication with said water supply passage, a distributing pipe extending outwardly and upwardly from said sprinkling member and in free communication with said chamber and adapted to distribute a stream of water substantially radially and upwardly from said sprinkling member, reaction means carried by said sprinkling member in communication with said chamber and adapted to produce a reaction force for rotation of said sprinkling member on said supporting member, a closed casing, intermeshing gears in said casing rotatable relatively thereto, and fluid damping means in said casing restricting the relative rotation of said casing and gears, said casing and gears being connected to said members for exerting a substantially uniform restraining effect on rotational movements of the sprinkling member, a plate adjustably mounted in said casing and adjacent the ends of said gears, and a manually operable means accessible from the exterior of said casing for moving said plate towards and from said gears to vary the restraining effect.

6. A water sprinkler comprising a supporting member, a rotatable sprinkling member, a distributing pipe extending outwardly and upwardly from said sprinkling member, means for producing a reaction force tending to rotate the sprinkling member, a closed casing fixed to said sprinkling member, a plurality of intermeshing gears mounted for relative rotational movements in said casing, means fixing one of said gears to said supporting member, liquid damping means in said casing, a pressure plate adjacent one side of all said gears, and an adjusting means for varying the position of said plate to provide a restricted return path for liquid displaced by the intermeshing gear teeth.

7. A water sprinkler comprising a supporting member, a rotatable sprinkling member, a distributing pipe extending outwardly and upwardly from said sprinkling member, means for producing a reaction force tending to rotate the sprinkling member, a closed casing detachably connected to the top of said sprinkling member, a plurality of intermeshing gears mounted for relative rotational movements in said casing, means fixing one of said gears to said supporting member, liquid damping means in said casing, a pressure plate adjacent one side of all said gears, and an adjusting means for varying the position of said plate.

8. In a device of the character described, a supporting member, a rotatable member in rotatable bearing engagement therewith, and means for damping relative rotational movement of said members comprising a casing, a plurality of intermeshing gears mounted for relative rotational movements in said casing, means fixing one of said gears to said supporting member, liquid damping means in said casing, a pressure plate engaging one side of all said gears, and an adjusting means for varying the position of said plate to vary the restriction of the return path for liquid displaced by the intermeshing gear teeth.

WALTER H. COLES.
BERT J. NELSON.